UNITED STATES PATENT OFFICE.

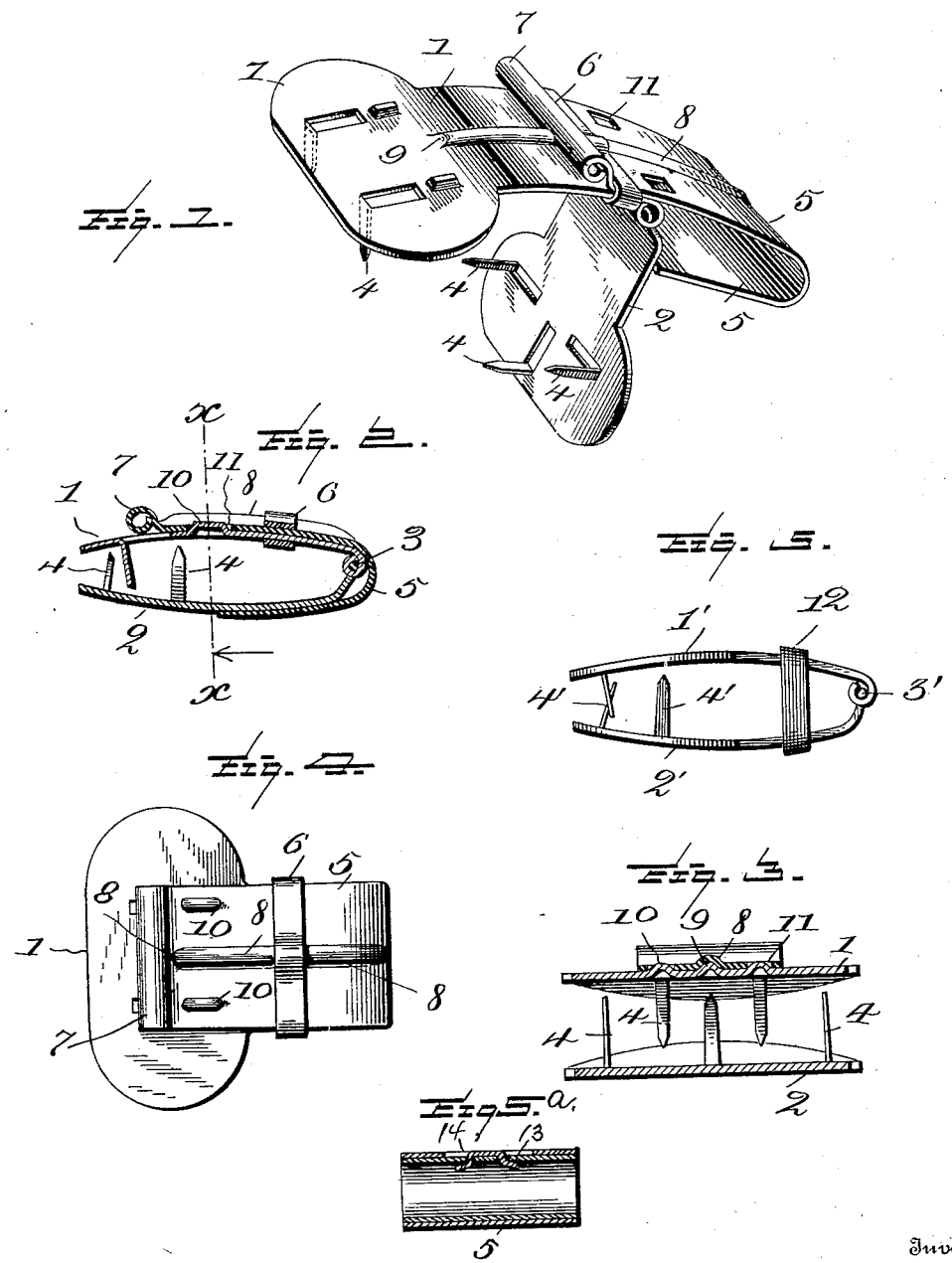

CALVIN H. WESTON, OF TYRONE, PENNSYLVANIA.

CLASP.

SPECIFICATION forming part of Letters Patent No. 632,483, dated September 5, 1899.

Application filed January 3, 1899. Serial No. 700,946. (No model.)

*To all whom it may concern:*

Be it known that I, CALVIN H. WESTON, a citizen of the United States, residing at Tyrone, in the county of Blair and State of Pennsylvania, have invented certain new and useful Improvements in Clasps; and I do hereby declare the following to be a full, clear, and exact description of the invention, such as will enable others skilled in the art to which it appertains to make and use the same.

My invention relates to certain new and useful improvements in clasps, and has for its object to produce a device of this character comprising two T-shaped leaves hinged together at the ends of their stems and provided with teeth on their inner faces and a spring-hook sliding on the stem of one of the leaves and adapted to close the leaves upon each other to cause their teeth to engage any part of the clothing, the said hook and leaf to which it is secured being provided with interlocking ridges for the guidance of the hook and lugs and eyes for securing same in its closed position.

With these and other objects in view my invention further consists in the novel details of construction and combination of parts to be fully described in the following specification and clearly set forth in the claims.

Referring to the accompanying drawings, forming a part of this specification, in which like characters of reference indicate similar parts throughout, Figure 1 is a perspective view of my clasp opened. Fig. 2 is a longitudinal sectional view thereof when closed. Fig. 3 is a transverse section on the line x x of Fig. 2. Fig. 4 is a plan view thereof, and Fig. 5 is a side elevation of a modification of my clasp.

In the drawings, 1 and 2 represent T-shaped leaves of sheet metal suitably hinged together at the ends 3 of their shanks and provided with prongs 4 cut from their heads and struck out to lie substantially perpendicular to the plane of said heads, as clearly shown in the drawings. These prongs 4 may be arranged in any suitable manner; but I preferably cut two longitudinally from the upper leaf 1 and one longitudinally from the center of the head of the lower leaf 2 to strike midway between the prongs of the upper leaf, and one from each side of the head of the lower leaf 2 at right angles to the other to engage the material between the other prongs and the hinge when the clasp is closed.

A U-shaped spring-hook 5, having one end prolonged and curled to form a rolled edge 7, is slidably secured to the shank of the upper leaf 1 by means of a slide-band 6, which loosely surrounds them both. This hook is also of sheet metal and is of the same width as the shank of the leaf 1, and has struck up along its center a longitudinal ridge 8, adapted to closely fit and slide over a similar ridge 9, struck up from the shank of the leaf 1. A pair of lugs 10 are struck up from the head on the leaf 1 just below the openings of the prongs and are adapted to engage suitable apertures 11, so located in the hook 5 as to be engaged by the lugs 10 when the hook has reached its extreme closed position. The slide-band 6 is dented to accommodate the ridge 8 of the hook and is limited in its movements by the shoulders of the leaf 1 and the hinge 3, but is free to slide between these parts. The hook 5 is prevented from being detached by the engagement of its rolled edge with the slide-band 6 and is limited in its inward movement by the engagement of its bent portion with the hinge 3.

From the foregoing it will be seen that the clasp when open, as shown in Fig. 1, may have its two leaves slipped around the part of the clothing or the like desired to be clasped, when the rolled edge 7 of the hook 5 is drawn along the leaf 1, thereby causing the under part of the hook to slide against the slanting surface of the leaf 2 and press the same toward the leaf 1, forcing the prongs through the clothing. When the hook has reached the limit of its inward movement, the apertures 11 therein engage the lugs 10 of the leaf 1 to prevent an accidental backward movement of the hook, and the slide-band 6 is drawn up as close to the lugs as possible to insure permanent engagement of the lugs.

It will be noted that the ridges 8 and 9, besides acting as a guide for the hook, serve to strengthen the hook and the leaf against bending.

In the modification shown in Fig. 5 I have hinged two leaves together, as in the other form; but instead of a hook and the parts made necessary by it I have simply surrounded the shanks of the leaves by a slide-band 12, which is adapted to operate on the diverging shanks of the leaves to force them into engagement similar to the action of the hook of the other form.

Though I have described the parts as being of sheet metal, it is obvious that any suitable material may be substituted therefor without departing from the spirit and scope of my invention.

Having described my invention, what I claim as new, and desire to secure by Letters Patent, is—

1. In a device of the character described, two T-shaped leaves hinged together at the ends of their shanks, a slide-band surrounding the shank of one leaf, a hook slidably secured to said leaf by means of the slide-band, and interlocking ridges formed in the hook and the first-named leaf substantially as described.

2. In a device of the character described, two T-shaped leaves hinged together at the ends of their shanks, a slide-band surrounding the shank of one leaf, a hook slidably secured to said leaf by means of the slide-band, interlocking ridges formed in the hook and the said leaf, and lugs projecting from said leaf adapted to engage apertures in the hook, substantially as described.

In testimony whereof I affix my signature in presence of two witnesses.

CALVIN H. WESTON.

Witnesses:
C. O. TEMPLETON,
H. C. SPRANKLE.